(12) United States Patent
Yao et al.

(10) Patent No.: US 12,341,423 B2
(45) Date of Patent: Jun. 24, 2025

(54) SWITCHING CIRCUIT AND POWER SUPPLY DEVICE

(71) Applicant: CONTEMPORARY AMPEREX TECHNOLOGY (HONG KONG) LIMITED, Hong Kong (CN)

(72) Inventors: Yuan Yao, Ningde (CN); Zhimin Dan, Ningde (CN); Meng Li, Ningde (CN); Yu Yan, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 87 days.

(21) Appl. No.: 18/325,966

(22) Filed: May 30, 2023

(65) Prior Publication Data

US 2023/0308013 A1     Sep. 28, 2023

Related U.S. Application Data

(63) Continuation of application No. PCT/CN2021/120619, filed on Sep. 26, 2021.

(51) Int. Cl.
*H02M 1/44* (2007.01)
*B60L 53/31* (2019.01)
*H02J 7/00* (2006.01)
*H02M 3/335* (2006.01)

(52) U.S. Cl.
CPC .............. *H02M 1/44* (2013.01); *B60L 53/31* (2019.02); *H02J 7/007* (2013.01); *H02M 3/33573* (2021.05); *H02M 3/33576* (2013.01); *H02J 2207/20* (2020.01)

(58) Field of Classification Search
CPC ......... H02M 1/44; H02J 7/007; H02J 2207/20
See application file for complete search history.

(56) References Cited

U.S. PATENT DOCUMENTS

| 2004/0164405 A1* | 8/2004 | Umezu | ............... H05K 1/0203 257/E23.102 |
|---|---|---|---|
| 2014/0003106 A1* | 1/2014 | Shirakawa | .......... H02M 1/4225 363/89 |

FOREIGN PATENT DOCUMENTS

| CN | 201418026 Y | 3/2010 | |
|---|---|---|---|
| CN | 209267447 U | 8/2019 | |
| CN | 209488450 U | 10/2019 | |
| CN | 110798123 A | 2/2020 | |
| CN | 110808682 B * | 6/2022 | .............. H02M 1/12 |
| EP | 2988367 A1 | 2/2016 | |
| JP | H11509675 A | 8/1999 | |

(Continued)

OTHER PUBLICATIONS

The Japan Patent Office (JPO) Notice of Reasons for Refusal for Application No. 2023-535553 Aug. 5, 2024 11 Pages (including translation).

(Continued)

*Primary Examiner* — Sisay G Tiku
(74) *Attorney, Agent, or Firm* — ANOVA LAW GROUP, PLLC

(57) ABSTRACT

A switching circuit includes a switching transistor, a metal unit, and a branch. The metal unit is provided at the switching transistor, and the branch is electrically connected between a ground and at least one of the switching transistor or between the metal unit. The branch includes a capacitor, and the capacitor is configured to discharge radiated interference.

11 Claims, 7 Drawing Sheets

(56) References Cited

FOREIGN PATENT DOCUMENTS

| | | |
|---|---|---|
| JP | 2000152613 A | 5/2000 |
| JP | 2008236988 A | 10/2008 |
| JP | 2013106503 A | 5/2013 |

OTHER PUBLICATIONS

Korean Intellectual Property Office (KIPO) Notice of departure for check for Application No. 10-2023-7018313 Jul. 23, 2024 38 Pages (including translation).

The World Intellectual Property Organization (WIPO) International Search Report for PCT/CN2021/120619 Apr. 26, 2022 7 pages (including English translation).

The European Patent Office (EPO) The Extended European Search Report for Application No. 21957968.7 Feb. 7, 15, 2024 9 Pages.

Ayan Mallik et al., "A comprehensive design approach to an EMI filter for a 6-kW three-phase boost power factor correction rectifier in avionics vehicular systems." IEEE Transactions on Vehicular Technology 66.4 (2016): 2942-2951.

Tao Qi et al., "Characterization of IGBT modules for system EMI simulation." 2010 Twenty-Fifth Annual IEEE Applied Power Electronics Conference and Exposition (APEC). IEEE, 2010. p. 2220-2225.

The Japan Patent Office (JPO) Notice of Reason for Refusal for Application No. 2023-535553 Jan. 28, 2025 8 Pages (including translation).

The Korean Intellectual Property Office Notice of Final Rejection for Application No. 10-2023-7018313 Mar. 24, 2025. 7 Pages (including translation).

\* cited by examiner

SWITCHING CIRCUIT AND POWER SUPPLY DEVICE

CROSS-REFERENCE TO RELATED APPLICATION

This application is a continuation of International Application No. PCT/CN2021/120619, filed on Sep. 26, 2021, the entire content of which is incorporated herein by reference.

TECHNICAL FIELD

The present application relates to the technical field of electronic circuits, and in particular, to a switching circuit and a power supply device.

BACKGROUND ART

Currently, in applications where switching transistors are used, heat may be typically generated due to losses, such as a turn-on loss, a turn-off loss, and a conduction loss, in the switching transistors. Thus, the switching transistor needs to be equipped with a heat sink to implement heat dissipation of the switching transistor. In addition, the heat sink is usually made of a metal material due to a better thermal conductivity effect of metal.

However, the switching transistor will generate electromagnetic interference (EMI for short) when it is turned on and turned off, and radiate emitted electromagnetic interference, that is, radiated interference. When passing through the heat sink made of the metal material, the radiated interference may increase the volume of a radiated interference propagation medium, which, in turn, causes more radiated interference to be generated.

In the related art, it is often necessary to add a shielding case for completely covering a heat sink, to reduce radiated interference. However, this solution may result in an increased volume and may also cause a poor heat dissipation effect.

SUMMARY

The present application is intended to provide a switching circuit and a power supply device, by which the radiated interference can be reduced while maintaining a heat dissipation effect, and the device volume is also small.

In order to achieve the above objectives, in a first aspect, the present application provides a switching circuit, which includes at least one switching transistor, a metal unit, and a first branch. The metal unit is provided at the switching transistor. The first branch is electrically connected between the switching transistor and the ground and/or between the metal unit and the ground. The first branch includes a first capacitor, and the first capacitor is configured to discharge radiated interference.

By providing the first capacitor, a discharge circuit can be formed to discharge the radiated interference generated by the switching transistor and further discharge radiated interference amplified by the metal unit, which facilitates reducing the risk of abnormalities caused by interference with each electronic device in the circuit, thereby improving the stability of the circuit during operation. In addition, compared with the technical solution of adding a shielding case, the first capacitor added in the present application has less impact on the heat dissipation of the metal unit, that is, it can maintain the heat dissipation effect of the metal unit; in addition, the added first capacitor has a volume smaller than that of the added shielding case, which facilitates reducing the volume of the entire switching circuit, so as to reduce the circuit design cost.

In an optional manner, the first branch further includes a first resistor. The first resistor is connected in series with the first capacitor.

The addition of the first resistor facilitates consumption of more radiated interference, thereby improving the stability of the switching circuit during operation.

In an optional manner, the first branch further includes a second capacitor. The first capacitor is connected in series with the second capacitor.

The addition of the second capacitor facilitates increasing a voltage withstand value of the first branch, so that the first branch is applicable to a variety of application scenarios with different voltages, thereby improving the practicability of the switching circuit.

In an optional manner, the at least one switching transistor includes at least two switching transistors. the metal unit includes metal sub-units which are in one-to-one correspondence with the switching transistors, where any first switching transistor is provided with a metal sub-unit. The first branch includes first sub-legs which are in one-to-one correspondence with the metal sub-units, where any one of the first sub-legs is electrically connected between one of the metal sub-units and the ground.

When each switching transistor is provided with a metal sub-unit, a first sub-leg may be provided between each metal sub-unit and the ground, such that radiated interference amplified by each metal sub-unit is discharged, which can make the discharge more thorough, and facilitate reducing the radiated interference to a greater extent, thereby improving the stability of the circuit during operation.

In an optional manner, the at least one switching transistor includes at least two bridge arms connected in parallel, where the bridge arm includes two switching transistors connected in series. The first branch includes second sub-legs which are in one-to-one correspondence with the bridge arms, where any one of the second sub-legs is electrically connected between one of the bridge arms and the ground.

When the circuit includes the at least two bridge arms connected in parallel, a second sub-leg can be provided in each bridge arm, to achieve the purpose of discharging electromagnetic interference.

In an optional manner, the switching circuit further includes a first spacer. The first spacer is provided between the switching transistor and the metal unit.

The first spacer is provided between the switching transistor and the metal unit to play a role of isolation.

In an optional manner, a capacitance of the first capacitor ranges from 1 nF to 10 nF, where nF represents the unit nanofarad of capacitance.

When the capacitance of the first capacitor ranges from 1 nF to 10 nF, a better discharge effect for radiated interference is achieved. In addition, within this range, the discharge effect also increases as the capacitance increases.

In an optional manner, the switching circuit further includes a filter branch. The filter branch is connected to an alternating-current power supply and the switching transistor, respectively, and the filter branch is configured to filter out differential-mode interference and common-mode interference from the alternating-current power supply.

The differential-mode interference and the common-mode interference are filtered out from the alternating-current power supply, so that a relatively stable alternating-current power supply can be provided for subsequent circuits, which facilitates improving the stability of the circuit during operation.

In a second aspect, the present application further provides a power supply device including a switching circuit in any of the above-mentioned embodiments.

In an optional manner, the power supply device is a switching power supply or a charging pile.

Beneficial effects of the embodiments of the present application are as follows. In the switching circuit provided in the present application, a first branch is electrically connected between the switching transistor and the ground and/or between the metal unit and the ground, and the first capacitor in the first branch is used to discharge radiated interference, including discharge of the radiated interference generated by the switching transistor and further discharge of the radiated interference amplified by the metal unit, which facilitates reducing the risk of abnormalities caused by interference with each electronic device in the circuit, thereby improving the stability of the circuit during operation. Secondly, compared with the technical solution of adding a shielding case in the related art, the first capacitor added in the present application has less impact on the heat dissipation of the metal unit, that is, it can maintain the heat dissipation effect of the metal unit. Furthermore, the added first capacitor also has a smaller volume compared with the volume of the added shielding case, which facilitates reducing the volume of the entire circuit, so as to reduce the circuit design cost.

BRIEF DESCRIPTION OF THE DRAWINGS

In order to illustrate the technical solutions of the embodiments of the present application more clearly, the drawings required in the description of the embodiments of the present application will be described briefly below. Obviously, the drawings described below are merely some embodiments of the present application, and for those of ordinary skill in the art, other drawings can also be obtained from these drawings without any creative efforts.

Figure 1:
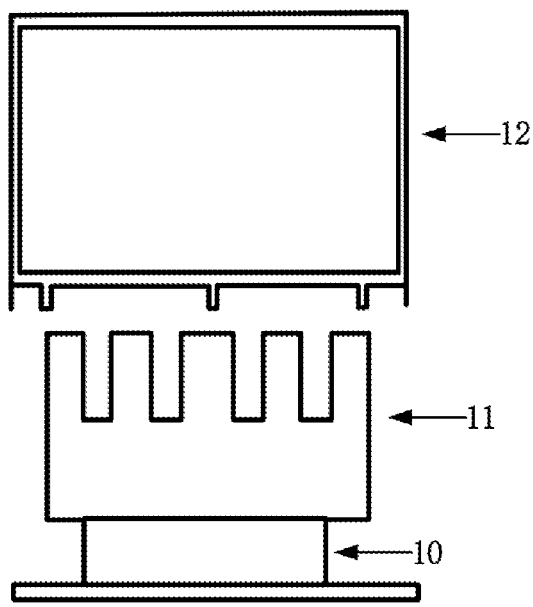
FIG. 1 is a schematic structural diagram of a shielding case and a MOS transistor disclosed in the related art.

In the accompanying drawings, the figures are not drawn to scale.

DETAILED DESCRIPTION OF EMBODIMENTS

The implementations of the present application will be further described in detail below in conjunction with the accompanying drawings and embodiments. The following detailed description of the embodiments and the accompanying drawings are used to illustrate the principle of the present application by way of example but should not be used to limit the scope of the present application. That is, the present application is not limited to the described embodiments.

In the description of the present application, it should be noted that "a plurality of" means two or more, unless otherwise specified. The orientation or position relationship indicated by the terms "upper", "lower", "left", "right", "inner", "outer", etc. is only for the convenience of describing the present application and simplifying the description, rather than indicating or implying that the device or element referred to must have a particular orientation or be constructed and operated in a particular orientation, and therefore should not be construed as a limitation on the present application. In addition, the terms "first", "second", "third", etc. are used for descriptive purposes only, and should not be construed as indicating or implying the relative importance. The term "perpendicular" does not mean being perpendicular in the strict sense, but within an allowable range of errors. The term "parallel" does not mean being parallel in the strict sense, but within an allowable range of errors.

The orientation terms in the following description all indicate directions shown in the drawings, but do not limit the specific structure in the present application. In the description of the present application, it should also be noted that the terms "mounting", "connecting", and "connection" should be interpreted in a broad sense, unless explicitly specified and defined otherwise, which, for example, may be a fixed connection, a detachable connection or an integral connection, or may be a direct connection, or an indirect connection through an intermediate medium. For those of ordinary skill in the art, the specific meanings of the terms mentioned above in the present application can be construed according to specific circumstances.

Referring to FIG. 1, FIG. 1 is a schematic structural diagram of a shielding case and a MOS transistor disclosed in the related art. As shown in FIG. 1, a heat sink 11 for heat dissipation is provided at the MOS transistor 10. During practical application, a switching transistor has a switching frequency of generally tens of kHz, or even hundreds of kHz, that is, the switching transistor has relatively large dv/dt and di/dt, which causes the switching transistor to radiate emitted electromagnetic interference with high frequency during a switching process, resulting in an increasingly growing amount of radiated interference generated. In order to reduce adverse impacts of the radiated interference generated by the MOS transistor 10 on the normal operation of other electronic devices, the shielding case 12 may cover the MOS transistor 10 and the heat sink 11 from top to bottom.

However, in the above manner, a large shielding case needs to be used, which results in an increase in the volume of the entire circuit and an apparatus including the circuit. Furthermore, with the increase of the number of the MOS transistors 10, the number of the shielding cases should also increase, which will lead to a relatively high overall cost of the circuit and less practicability thereof. In addition, the addition of a shielding case may also cause a poor heat dissipation effect, and thus increase the risk of damage to electronic devices such as the MOS transistor 10.

In view of this, an embodiment of the present disclosure provides a switching circuit. In the switching circuit, a branch including a first capacitor may be added to form a discharge circuit. In addition, the discharge circuit is used to discharge radiated interference generated by a switching transistor in the switching circuit. As such, the radiated interference can be reduced while maintaining a heat dissipation effect, and the device volume is also small.

The switching circuit disclosed in the embodiments of the present application may be used in, but not limited to, a power supply device such as a switching power supply or a charging pile. A power supply system composed of a power supply device having a switching circuit disclosed in the present application may be used, such that a relatively stable working power supply can be provided for the power supply system, which facilitates improving the stability of the power supply system during operation.

Figure 2:
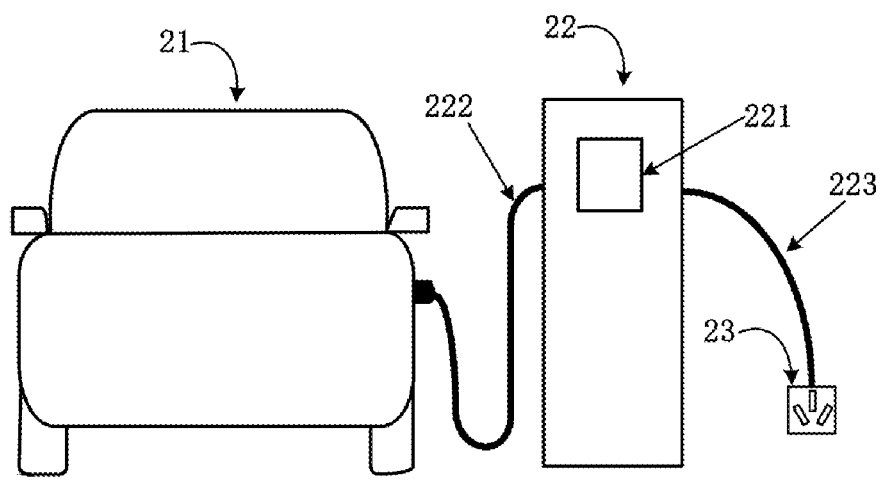
FIG. 2 is a schematic diagram of an application scenario disclosed in an embodiment of the present application.

For the convenience of understanding the present application, an applicable application scenario of the present application may be first described. As shown in FIG. 2, an electric vehicle 21, a charging pile 22, and a connector 23 are included in the application scenario. The charging pile 22 includes a power conversion module 221, a charging cable 222, and a power cable 223.

The power cable 223 is used to connect to an external input power supply (e.g., mains power) via the connector 23 (e.g., a socket), to obtain an input voltage. The power conversion module 221 is provided with a switching circuit in any embodiment of the present application, to obtain, through the input voltage, a relatively stable voltage that can be used to supply power to a load. In this embodiment, the power conversion module 221 is configured to convert the obtained input voltage into a voltage that can be used to charge the electric vehicle 21. Then, the power conversion module transmits the voltage to the electric vehicle 21 via the charging cable 222, to charge the electric vehicle 21.

It should be noted that in this embodiment, the charging pile is, for example, a power supply device. However, in other embodiments, the power supply device may also be, but is not limited to, an on-board charger, an off-board charger, a switching power supply, etc.

Figure 3:
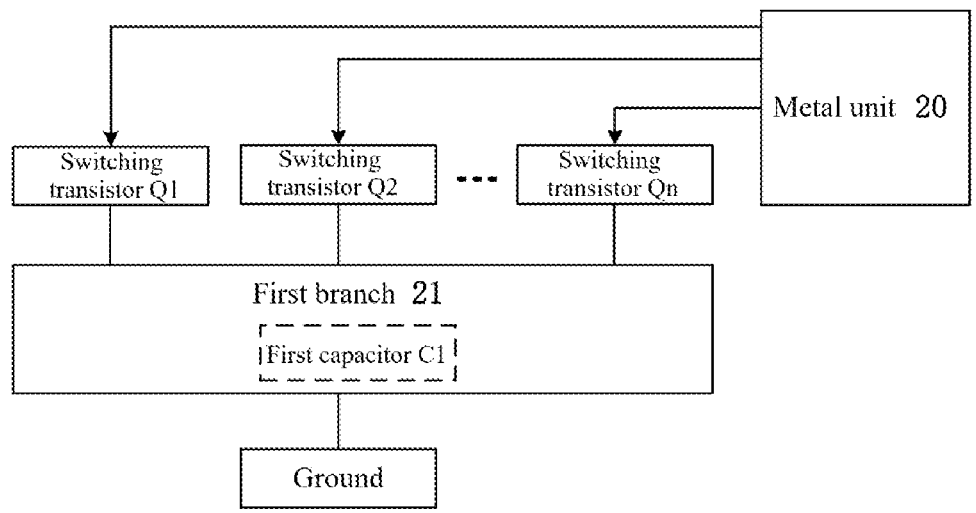
FIG. 3 is a schematic structural diagram of a switching circuit disclosed in an embodiment of the present application.

Referring to FIG. 3, FIG. 3 is a schematic structural diagram of a switching circuit disclosed in an embodiment of the present application. As shown in FIG. 3, the switching circuit includes a metal unit 20, a first branch 21, and at least one switching transistor. The at least one switching transistor includes a switching transistor Q1, a switching transistor Q2, . . . , and a switching transistor Qn, where n is a positive integer. The first branch 21 includes a first capacitor C1.

The metal unit 20 may include a glossy substance having good electrical conductivity, thermal conductivity and mechanical properties, and having a positive temperature coefficient of resistance, such as aluminum or copper, which is not limited in the embodiments of the present application.

Specifically, the metal unit 20 may be provided at the switching transistor Q1, the switching transistor Q2, . . . , and the switching transistor Qn in a direction indicated by the arrow.

In an implementation, the metal unit 20 may be mounted on the switching transistor Q1, the switching transistor Q2, . . . , and the switching transistor Qn in a manner as shown in FIG. 1 The first branch 21 is electrically connected between the switching transistor Q1, the switching transistor Q2, . . . , and the switching transistor Qn and the ground, and can achieve the purpose of discharging radiated interference by using the first capacitor C1.

The radiated interference is generated by the switching transistor during rapid switching, and the metal unit 20 may increase the volume of propagation of the radiated interference, further increasing the radiated interference. By providing the first capacitor C1, a discharge circuit can be provided to more effectively reduce the radiated interference, which facilitates reducing the risk of abnormal operation of the switching circuit due to the radiated interference, thereby improving the stability of the switching circuit during operation.

Furthermore, compared with the technical solution of adding a shielding case in the related art, the first branch 21 has little impact on the heat dissipation of the metal unit 20 in the present application, so that a better heat dissipation effect of the metal unit 20 is still maintained. In addition, the first branch 21 also has a smaller volume compared with the volume of the added shielding case, which facilitates reducing the volume of the entire switching circuit, so as to reduce the circuit design cost.

Figure 4:
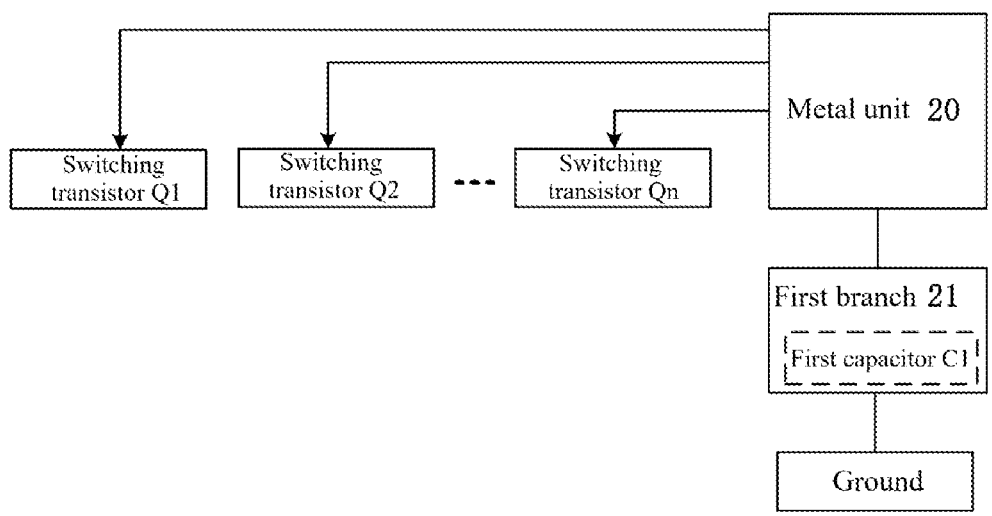
FIG. 4 is a schematic structural diagram of a switching circuit disclosed in another embodiment of the present application.
Figure 5:
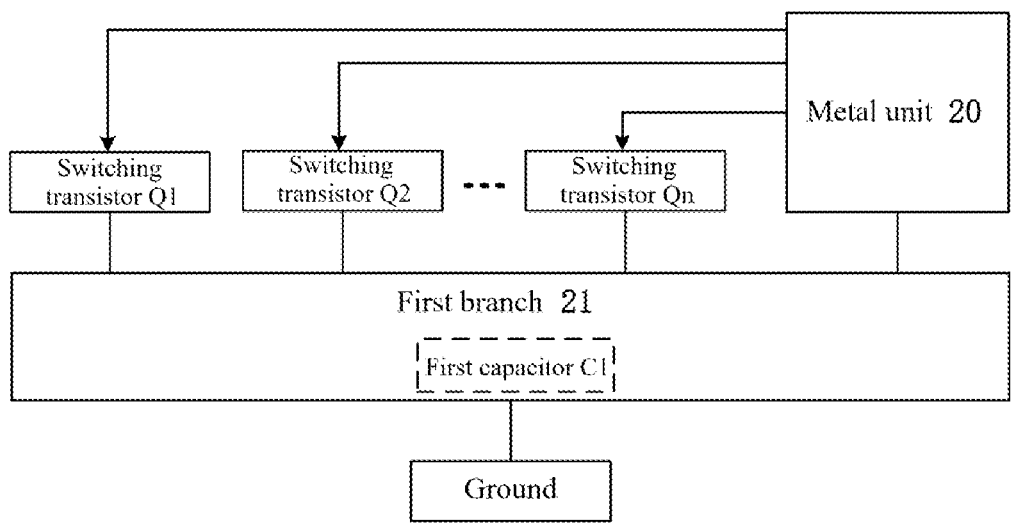
FIG. 5 is a schematic structural diagram of a switching circuit disclosed in still another embodiment of the present application.

It should be noted that in this embodiment, the first branch 21 is electrically connected, for example, between the switching transistor Q1, the switching transistor Q2, . . . , and the switching transistor Qn and the ground. In another embodiment, as shown in FIG. 4, the first branch 21 may also be electrically connected between the metal unit 20 and the ground. In still another embodiment, as shown in FIG. 5, the first branch 21 may be electrically connected between the metal unit 20 and the ground, and at the same time, may also be electrically connected between the switching transistor Q1, the switching transistor Q2, . . . , and the switching transistor Qn and the ground. In the embodiment shown in FIG. 3, 4 or 5, the purpose of discharging radiated interference by using the first capacitor C1 can be achieved.

Additionally, each switching transistor may be a metal oxide semiconductor field-effect transistor, an insulated gate bipolar transistor, or other switching elements, which is not limited in the embodiments of the present application.

In an embodiment, the first branch 21 further includes a first resistor. The first resistor is connected in series with the first capacitor. The structure shown in FIG. 3 further including the first resistor is taken as an example for description.

Figure 6:
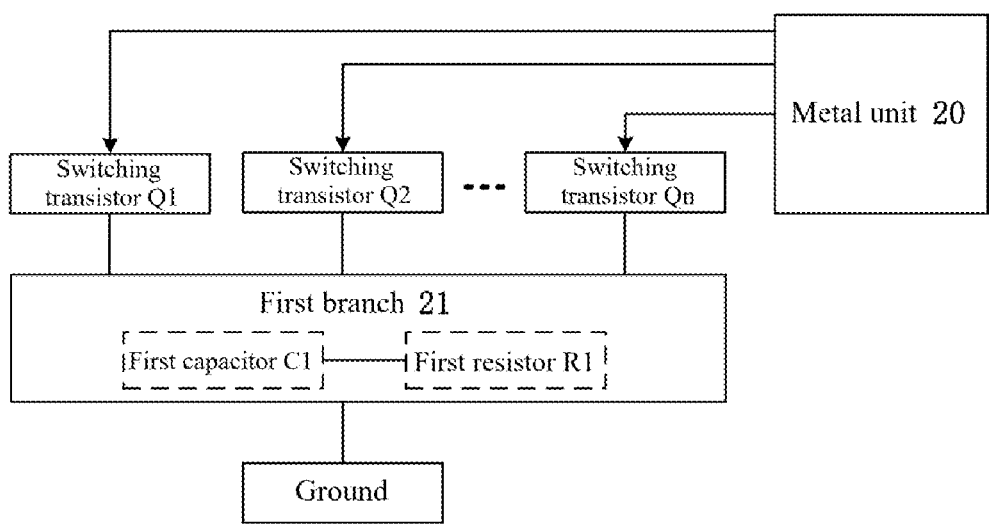
FIG. 6 is a schematic structural diagram of a switching circuit disclosed in yet another embodiment of the present application.

As shown in FIG. 6, the first branch 21 includes a first resistor R1 and a first capacitor C1 connected in series. The first resistor R1 and the first capacitor C1 are interchangeable in position. In other words, the switching transistor Q1, the switching transistor Q2, . . . , and the switching transistor Qn may be connected to the first capacitor C1 and the first resistor R1 in sequence, or the switching transistor Q1, the switching transistor Q2, . . . , and the switching transistor Qn may be connected to the first resistor R1 and the first capacitor C1 in sequence.

The addition of the first resistor R1 facilitates faster consumption of more radiated interference, thereby further improving the stability of the switching circuit during operation.

It may be understood that the first branch 21 provided in this embodiment may be applied to the circuit structure shown in FIG. 4 or 5, which is easily understood by a person skilled in the art, and will not be described in detail herein.

In an embodiment, the first branch 21 further includes a second capacitor, and the second capacitor is connected in series with the first capacitor. The structure shown in FIG. 3 further including the second capacitor is taken as an example for description.

Figure 7:
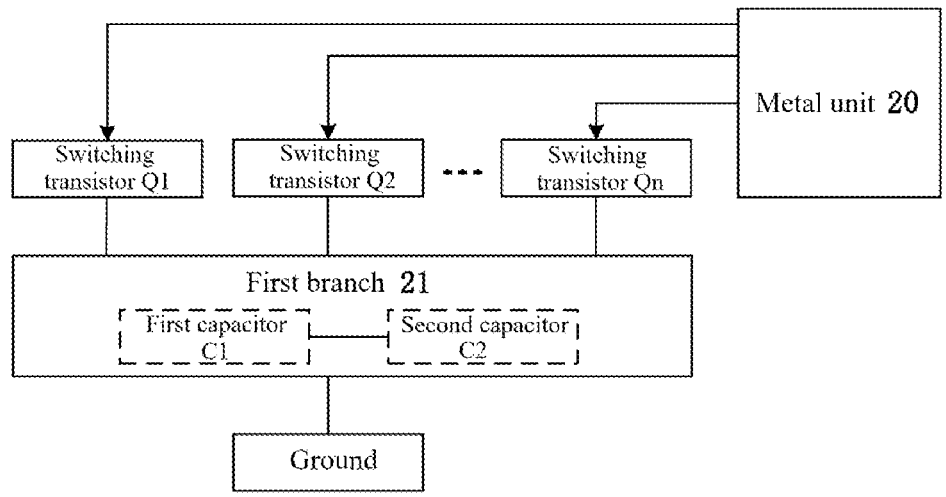
FIG. 7 is a schematic structural diagram of a switching circuit disclosed in still yet another embodiment of the present application.

As shown in FIG. 7, the first branch 21 includes a second capacitor C2 and a first capacitor C1 connected in series.

In an embodiment, capacitance values of the first capacitor C1 and the second capacitor C2 may be set to be equal, so that a total capacitance value of a circuit formed by connecting the first capacitor C1 and the second capacitor C2 in series is equal to the capacitance value of the first capacitor C1. Keeping the capacitance value unchanged enables the capacitance value to be maintained at a low value, which facilitates reducing the occurrence of abnormalities, such as a short circuit, in the switching circuit due to an excessive capacitance value. In addition, connecting a plurality of capacitors in series enables a voltage withstand value of the first branch 21 to be increased, so that the first branch is applicable to a variety of application scenarios with different voltages, thereby facilitating an improvement in the practicability of the switching circuit.

It may be understood that the first branch 21 provided in this embodiment may also be applied to the circuit structure shown in FIG. 4 or 5, which is easily understood by a person skilled in the art, and will not be described in detail herein.

Furthermore, in the embodiments of the present application, the content related to the first branch 21 may be used alone or in combination, which is not limited in the embodiments of the present application. For example, in an implementation, the structure of the first branch 21 shown in FIG. 6 may be combined with that shown in 7. In other words, in this embodiment, the first branch 21 includes the first capacitor C1, the second capacitor C2, and the first resistor R1 connected in series.

In an embodiment, n may be set to a positive integer greater than 1 on the circuit structure shown in FIG. 3, that is to say, the switching circuit includes at least two switching transistors in this case.

Figure 8:
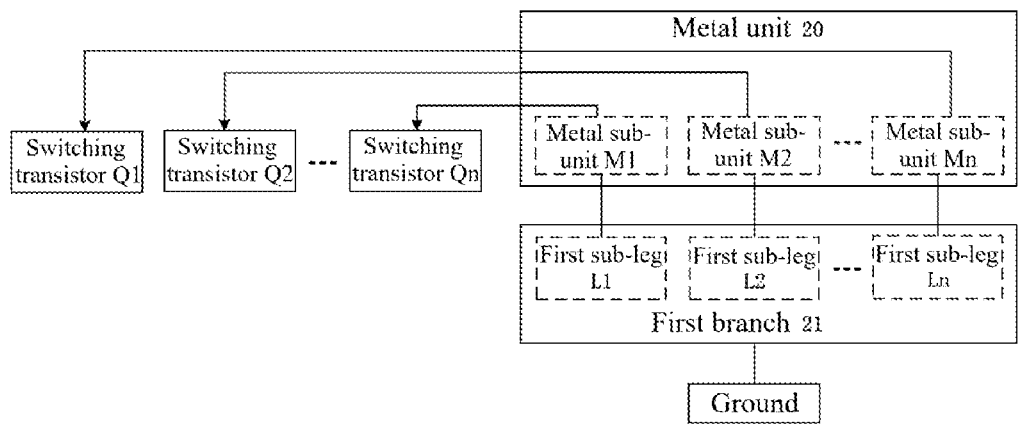
FIG. 8 is a schematic structural diagram of a switching circuit disclosed in a further embodiment of the present application.

Referring to FIG. 8, the metal unit 20 includes a metal sub-unit M1, a metal sub-unit M2, . . . , and a metal sub-unit Mn. The metal sub-unit M1 is provided at the switching transistor Q1, the metal sub-unit M2 is provided at the switching transistor Q2, . . . , and the metal sub-unit Mn is provided at the switching transistor Qn. In other words, the metal sub-units are in one-to-one correspondence with the switching transistors, and each switching transistor has a metal sub-unit provided thereon.

In this embodiment, the first branch 21 needs to include a first sub-leg L1, a first sub-leg L2, . . . , and a first sub-leg Ln, and the first sub-legs are in one-to-one correspondence with the metal sub-units. In this case, the first sub-leg L1 is electrically connected between the metal sub-unit M1 and the ground, the first sub-leg L2 is electrically connected between the metal sub-unit M2 and the ground, . . . , and the first sub-leg Ln is electrically connected between the metal sub-unit Mn and the ground. In other words, there is a first sub-leg connected between each metal sub-unit and the ground.

It may be understood that the structure of any first sub-leg may be the same as the structure of the first branch 21 in FIG. 3, 4, 5, 6 or 7. Therefore, radiated interference amplified by each metal sub-unit can be discharged, which can make the discharge of radiated interference more thorough, and facilitate reducing the radiated interference to a greater extent, thereby improving the stability of the circuit during operation.

Secondly, in this embodiment, the number of the metal sub-units is, for example, equal to the number of the switching transistors. However, in other embodiments, the number of the metal sub-units may also be not equal to the number of the switching transistors. For example, a plurality of switching transistors may share one metal sub-unit. In this case, the first sub-legs are correspondingly provided according to the number of the metal sub-units, which can also implement the discharge of radiated interference amplified by each metal sub-unit.

Figure 9:
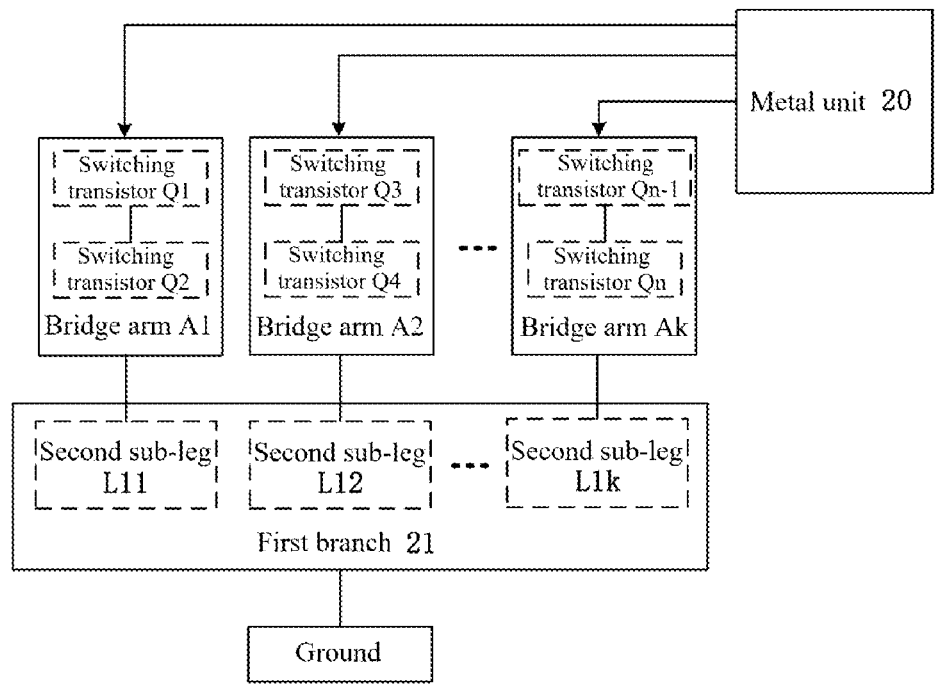
FIG. 9 is a schematic structural diagram of a switching circuit disclosed in still further embodiment of the present application.

In an embodiment, the switching circuit includes at least two bridge arms. As shown in FIG. 9, the switching circuit includes a bridge arm A1, a bridge arm A2, . . . , and a bridge arm Ak, where k is a positive integer greater than 1. The bridge arm A1 includes a switching transistor Q1 and a switching transistor Q2, the bridge arm A2 includes a switching transistor Q3 and a switching transistor Q4, . . . , and the bridge arm Ak includes a switching transistor Qn−1 and a switching transistor Qn. In other words, each bridge arm includes two switching transistors.

Then, in this embodiment, the first branch 21 includes second sub-legs which are in one-to-one correspondence with the bridge arms. In other words, the first branch 21 includes a second sub-leg L11, a second sub-leg L12, . . . , and a second sub-leg L1k. Each second sub-leg is electrically connected between a bridge arm and the ground. In other words, the second sub-leg L11 is electrically connected between the bridge arm A1 and the ground, the second sub-leg L12 is electrically connected between the bridge arm A2 and the ground, . . . , and the second sub-leg L1k is electrically connected between the bridge arm Ak and the ground.

It may be understood that the structure of any second sub-leg may be the same as the structure of the first branch 21 in FIG. 3, 4, 5, 6 or 7. Therefore, radiated interference generated by each bridge arm can be discharged, which can make the discharge of radiated interference more thorough, and thus facilitates improving the stability of the circuit during operation.

In an embodiment, the switching circuit further includes a first spacer, and the first spacer is provided between the switching transistor and the metal unit. The first spacer can be used to isolate the switching transistor from the metal unit, to reduce the risk of electric shock caused by the conduction of a voltage or current on the switching transistor through the metal unit.

Figure 10:
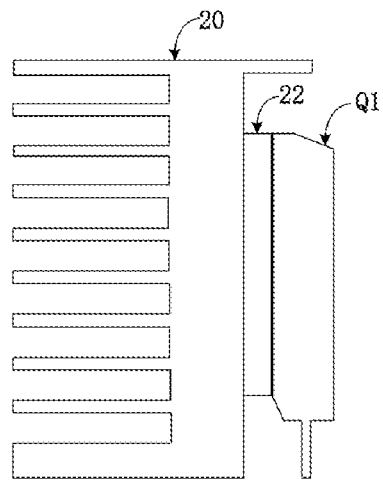
FIG. 10 is a schematic structural diagram of a first spacer, a switching transistor, and a metal unit disclosed in an embodiment of the present application.

For example, the switching transistor being Q1 and the metal unit being the heat sink is taken as an example for description. As shown in FIG. 10, a first spacer 22 is provided between the switching transistor Q1 and the metal unit 20. Since heat generation caused by a series of losses, such as a turn-on loss, a turn-off loss and a conduction loss, in the switching transistor Q1 is inevitable, the metal unit 20 (i.e., a heat sink) needs to be provided at the switching transistor Q1 for heat dissipation, to extend the service life of the switching transistor Q1. Furthermore, since the switching transistor Q1 carries a voltage or current, the first spacer 22 may be provided between the switching transistor Q1 and the metal unit 20. The first spacer 22 should be an insulating material, and the insulation material should have thermal conductivity to transfer heat on the switching transistor Q1 to the metal unit 20, thereby completing the heat dissipation process of the switching transistor Q1.

In an embodiment, a capacitance of the first branch 21 ranges from 1 nF to 10 nF, where nF represents the unit nanofarad of capacitance. For example, as shown in FIG. 3, when the first branch 21 includes the first capacitor C1, the capacitance of the first capacitor C1 ranges from 1 nF to 10 nF. For another example, as shown in FIG. 7, when the first branch 21 includes the first capacitor C1 and the second capacitor C2, a total capacitance of the first capacitor C1 and the second capacitor C2 ranges from 1 nF to 10 nF.

When the capacitance of the first branch 21 ranges from 1 nF to 10 nF, the first branch 21 achieves a better discharge effect for radiated interference. In addition, within this range, the discharge effect also increases as the capacitance increases.

In an embodiment, the switching circuit further includes a filter branch. The filter branch is connected to an alternating-current power supply and the switching transistor, respectively, and the filter branch is configured to filter out differential-mode interference and common-mode interference from the alternating-current power supply. The common-mode interference is defined as an undesired potential difference between any current carrying conductor and the reference ground. The differential-mode interference is defined as an undesired potential difference between any two current carrying conductors.

Figure 11:
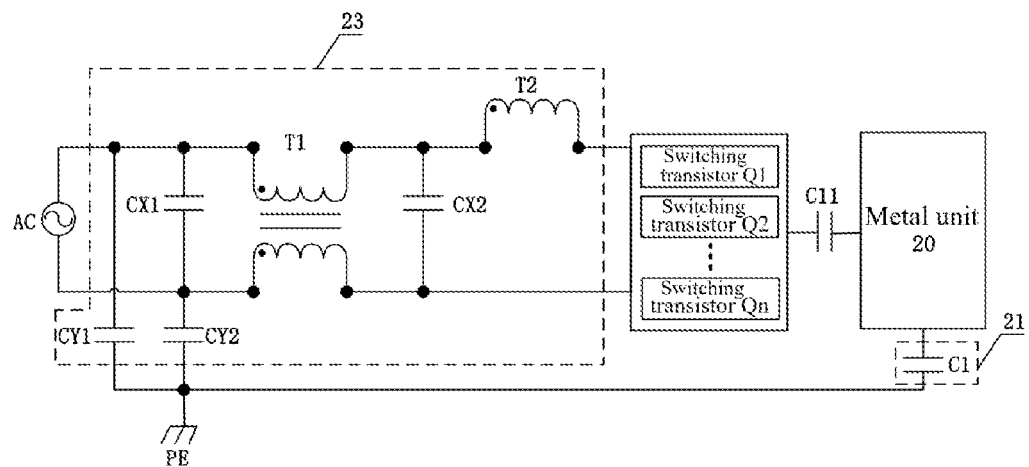
FIG. 11 is a schematic diagram of the circuit structure of a switching circuit disclosed in an embodiment of the present application.

Specifically, a circuit structure of an exemplary switching circuit shown in FIG. 11 is taken as an example for description. As shown in FIG. 11, the switching circuit includes a metal unit 20, a first branch 21, and a filter branch 23. The switching circuit further includes a switching transistor Q1, a switching transistor Q2, . . . , and a switching transistor Qn, and a first spacer, where the first spacer may be equivalent to a parasitic capacitor C11 with a smaller capacitance value. Furthermore, in this embodiment, the first branch 21 only includes, for example, the first capacitor C1. The filter branch 23 is electrically connected between the alternating-current (AC) power supply and each switching transistor, the parasitic capacitor C11 is electrically connected between each switching transistor and the metal unit 20, and the first capacitor C1 is electrically connected between the metal unit 20 and the ground (which may also be a housing of an apparatus including the switching circuit).

Specifically, the first capacitor C1 can provide a discharge circuit for the radiated interference generated by each switching transistor. The discharge circuit includes the metal unit 20, the first capacitor C1, the filter branch 23, each switching transistor, the parasitic capacitor C11, and the metal unit 20 in sequence. As such, the radiated interference through the metal unit can be consumed in the discharge circuit, so that a value of radiated interference is decreased to a greater extent.

Figure 12:
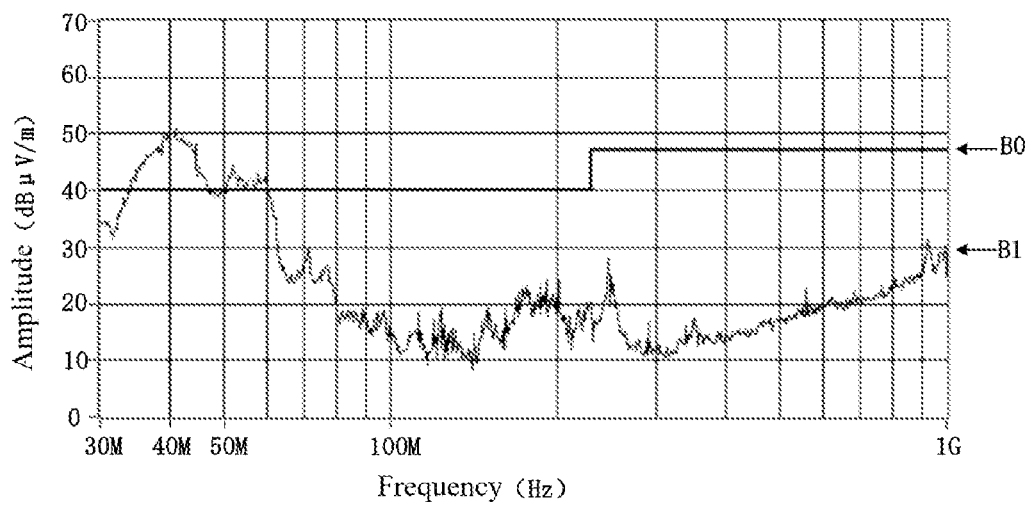
FIG. 12 is a schematic diagram of a waveform of radiated interference without addition of a first branch, disclosed in an embodiment of the present application.
Figure 13:
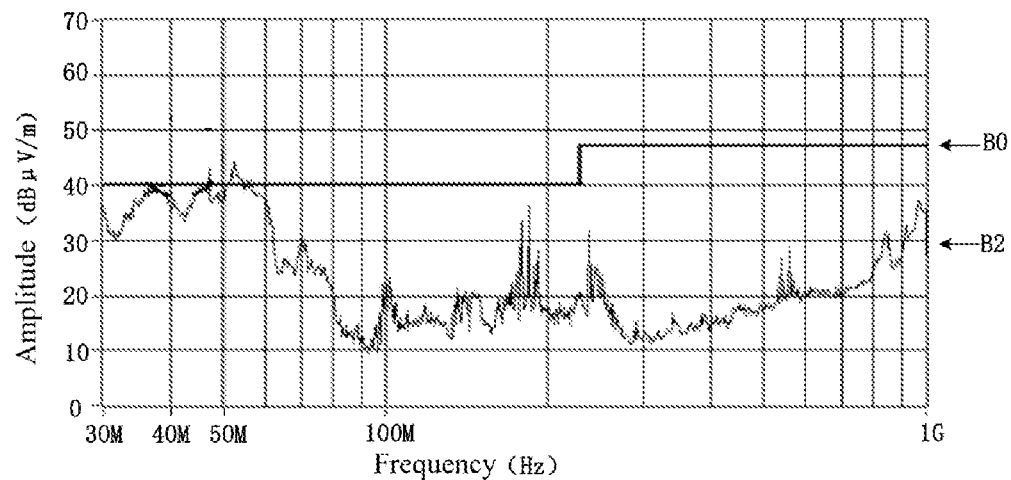
FIG. 13 is a schematic diagram of a waveform of radiated interference with addition of a first branch, disclosed in an embodiment of the present application.

Referring to both FIGS. 12 and 13, FIG. 12 shows the radiated interference without adding the first branch 21, and FIG. 13 shows the radiated interference after adding the first branch 21. Waveforms B1 and B2 are waveforms of the radiated interference; and A waveform B0 is a safety threshold of the radiated interference, and only below this safety threshold, can the impact of the radiated interference on other electronic devices be approximately negligible.

Specifically, as shown in FIG. 12, if the first branch 21 is not added to the switching circuit, the waveform B1 exceeds the waveform B0 in a frequency band between 35 MHz and 50 MHz, that is, the amplitude of the radiated interference exceeds the safety threshold. Further, as shown in FIG. 13, after the first branch 21 is added, the waveform B2 is mostly smaller than the waveform B0 in a frequency band between 35 MHz and 50 MHz, that is, the amplitude of most of the radiated interference has decreased below the safety threshold. Particularly at a frequency of about 40 MHz, the amplitude of the radiated interference is reduced by about 10 dB, which presents a more remarkable effect.

It can be seen that the addition of the first branch 21 enables the radiated interference to be reduced to a greater extent, which facilitates providing protection for various electronic devices in the switching circuit, thereby extending the service life of the electronic devices. Furthermore, the stability of the switching circuit during operation is also improved. Secondly, electrically connecting the added first capacitor C1 between the metal unit 20 and the ground enables the probability of a short circuit in the first capacitor C1 to be reduced, thereby providing protection for the first capacitor C1.

It may be understood that in this embodiment, the first branch 21 is electrically connected between the metal unit 20 and the ground. In other embodiments, the first branch 21 may also be electrically connected between each switching transistor and the ground. The specific implementation has been described in the above embodiments, and will not be described in detail herein.

In an embodiment, the filter branch 23 include a first safety capacitor CY1, a second safety capacitor CY2, a third safety capacitor CX1, a fourth safety capacitor CX2, a common mode inductor T1, and an excitation inductor T2. The first safety capacitor CY1 is electrically connected between a first terminal of an alternating-current (AC) power supply and the ground; the second safety capacitor CY2 is electrically connected between a second terminal of the alternating-current (AC) power supply and the ground; the third safety capacitor CX1 is electrically connected between the first terminal of the alternating-current (AC) power supply and the second terminal of the alternating-current (AC) power supply; A first dotted terminal of the common mode inductor T1 is electrically connected to the first terminal of the alternating-current (AC) power supply, a second dotted terminal of the common mode inductor T1 is electrically connected to the second terminal of the alternating-current (AC) power supply, a first undotted terminal of the common mode inductor T1 is connected to a first terminal of the fourth safety capacitor CX2, and a second undotted terminal of the common mode inductor T1 is connected to a second terminal of the fourth safety capacitor CX2; and the first terminal of the fourth safety capacitor CX2 is also electrically connected to each switching transistor via the excitation inductor T2, and the second terminal of the fourth safety capacitor CX2 is electrically connected to each switching transistor.

Specifically, the first safety capacitor CY1 and the second safety capacitor CY2 are configured to eliminate differential-mode interference. The third safety capacitor CX1 and the fourth safety capacitor CX2 are configured to eliminate common-mode interference. The common mode inductor T1 is used to filter out common-mode electromagnetic interference on signal lines, and may also be used to suppress itself from emitting electromagnetic interference to the outside, to prevent the normal operation of other electronic devices in the same electromagnetic environment from being affected.

The excitation inductor T2 is configured to implement voltage step-up and step-down.

In this embodiment, the safety capacitor refers to a safety capacitor that neither causes electric shock nor endangers personal safety after the capacitor fails, and the use of the safety capacitor for each capacitor can improve the stability of the switching circuit during operation. Certainly, in other embodiments, other types of capacitors may also be used, which is not limited in the embodiments of the present application. In addition, in this embodiment, the differential-mode interference and the common-mode interference are filtered out from the alternating-current power supply, so that a relatively stable alternating-current power supply can be provided for subsequent circuits, which facilitates improving the stability of the circuit during operation.

It should be noted that the circuit structure of the switching circuit shown in FIG. 11 is merely an example, and the switching circuit may have more or fewer components than shown in the figure, may combine two or more components, or may have different component configurations, which is not limited in the embodiments of the present application. For example, in an embodiment, the switching circuit may be a resonant bidirectional full-bridge DC/DC conversion circuit. For another example, in another embodiment, the switching circuit may also be a phase-shifted full-bridge circuit.

Figure 14:
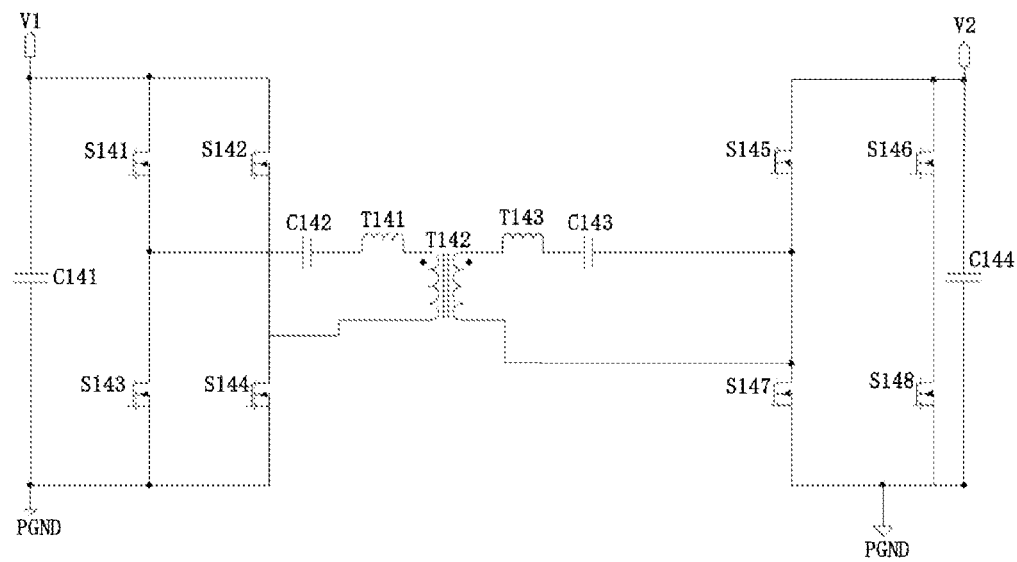
FIG. 14 is a schematic diagram of the circuit structure of a switching circuit disclosed in another embodiment of the present application.

The resonant bidirectional full-bridge DC/DC conversion circuit may be as shown in FIG. 14. In the circuit, a switching transistor S141, a switching transistor S142, a switching transistor S143, a switching transistor S144, a switching transistor S145, a switching transistor S146, a switching transistor S147, and a switching transistor S148 may each be provided with a metal unit. Then, a first branch may be provided between each switching transistor and the ground and/or between the metal unit and the ground, to discharge radiated interference generated by each switching transistor. The specific implementation process has been described in the above embodiments, and will not be described in detail herein.

An embodiment of the present application provides a power supply device including a switching circuit in any of the above-mentioned embodiments. The power supply device may be a device that obtains energy from a power grid, and provides, to one or more loads, electric energy obtained through conversion.

In an embodiment, the power supply device is a switching power supply or a charging pile. The switching power supply or the charging pile may obtain an input voltage from mains power, and convert the input voltage into a voltage that can be used by other apparatuses.

While the present application has been described with reference to some embodiments, various modifications can be made, and equivalents can be provided to substitute for the components thereof without departing from the scope of the present application. In particular, the technical features mentioned in the embodiments can be combined in any manner, provided that there is no structural conflict. The present application is not limited to the specific embodiments disclosed herein but includes all the technical solutions that fall within the scope of the claims.

What is claimed is:

1. A switching circuit, comprising:
at least two switching transistors;
a metal unit comprising metal sub-units in one-to-one correspondence with the switching transistors, wherein each of the metal sub-units is provided at one of the switching transistors; and
a branch comprising a capacitor, the capacitor being configured to discharge radiated interference;
wherein:
the metal unit is electrically connected to a ground through the switching transistors and the branch in sequence; and
the branch comprises sub-legs in one-to-one correspondence with the metal sub-units, wherein each of the sub-legs is electrically connected between one of the metal sub-units and the ground.

2. The switching circuit according to claim 1, wherein the branch further comprises a resistor connected in series with the capacitor.

3. The switching circuit according to claim 1, wherein:
the capacitor is a first capacitor; and
the branch further comprises a second capacitor connected in series with the first capacitor.

4. The switching circuit according to claim 1, wherein:
the switching transistors form at least two bridge arms connected in parallel, wherein each of the bridge arms comprises two of the switching transistors connected in series; and
the sub-legs of the branch are in one-to-one correspondence with the bridge arms, wherein each of the sub-legs is electrically connected between one of the bridge arms and the ground.

5. The switching circuit according to claim 1, further comprising:
a spacer provided between at least one of the switching transistors and the metal unit.

6. The switching circuit according to claim 1, wherein a capacitance of the capacitor ranges from 1 nF to 10 nF, wherein nF represents the unit nanofarad of capacitance.

7. The switching circuit according to claim 1, further comprising:
a filter branch connected to an alternating-current power supply and the switching transistors, wherein the filter branch is configured to filter out differential-mode interference and common-mode interference from the alternating-current power supply.

8. A power supply device, comprising:
the switching circuit according to claim 1.

9. The power supply device according to claim 8, wherein the power supply device is a switching power supply or a charging pile.

10. A switching circuit, comprising:
at least two switching transistors;
a metal unit comprising metal sub-units in one-to-one correspondence with the at least two switching transistors, wherein each of the metal sub-units is provided at one of the at least two switching transistors; and
a branch comprising sub-legs in one-to-one correspondence with the metal sub-units, wherein each of the sub-legs is electrically connected between a ground and one of the metal sub-units;
wherein the branch comprises a capacitor, and the capacitor is configured to discharge radiated interference.

11. A switching circuit, comprising:
a plurality of switching transistors forming at least two bridge arms connected in parallel, wherein each of the bridge arms comprises two of the plurality of switching transistors connected in series;
a metal unit provided at one of the plurality of switching transistors; and a branch comprising sub-legs in one-to-one correspondence with the bridge arms, wherein each of the sub-legs is electrically connected between a ground and one of the bridge arms;

wherein the branch comprises a capacitor, and the capacitor is configured to discharge radiated interference.

* * * * *